US006296392B1

(12) United States Patent
McMeekin et al.

(10) Patent No.: US 6,296,392 B1
(45) Date of Patent: Oct. 2, 2001

(54) PLAIN BEARING STRUCTURE

(75) Inventors: Kenneth Macleod McMeekin; Janette Johnston, both of Ayrshire (GB)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/355,640

(22) PCT Filed: Jan. 22, 1998

(86) PCT No.: PCT/GB98/00196

§ 371 Date: Jul. 28, 1999

§ 102(e) Date: Jul. 28, 1999

(87) PCT Pub. No.: WO98/32983

PCT Pub. Date: Jul. 30, 1998

(30) Foreign Application Priority Data

Jan. 29, 1997 (GB) .................................... 9701778

(51) Int. Cl.⁷ ..................................... F16C 17/00
(52) U.S. Cl. ..................... 384/279; 384/300; 384/907.1; 384/910
(58) Field of Search .................... 384/279, 298, 384/300, 910, 907.1

(56) References Cited

U.S. PATENT DOCUMENTS 4,847,135   7/1989   Braus et al. ......................... 428/138

FOREIGN PATENT DOCUMENTS 0 232 922 A1   8/1987   (EP) ................ F16C/33/20
WO 95/02772   1/1995   (WO) ............................ F16C/33/20

*Primary Examiner*—Lenard A. Footland
(74) *Attorney, Agent, or Firm*—Rader, Fishman & Grauer PLLC

(57) ABSTRACT

A plain bearing comprises a metal backing, a layer of a porous matrix of sintered metal on the backing and a filled PTFE infiltrated into the interstices of the sintered layer and standing proud of the sintered layer, wherein the PTFE is filled with 1–20% by volume fibrillated aramid fibres and 10–30% by volume glass. The glass is preferably E-glass present as milled filaments of length 0.05–0.30 mm and diameter 0.010–0.020 mm and coated with a silene sizing agent. The fibrillated aramid fibres provide reinforcement and improved load bearing capacity and the glass provides an abrasive filler which abrades asperities on a body and creates a smooth polished surface against which to bear, thereby improving its life. The PTFE preferably also includes ferric oxide and carbon black to about 1.5% and 1.2% by volume respectively which both pigment the polymer and act as an abrasive and lubricant respectively. The carbon black content may be increased to about 10% to provide electrical conductivity. The filler may be prepared as a wet mush or a dry "paper".

23 Claims, No Drawings

PLAIN BEARING STRUCTURE

This invention is concerned with plain bearings, in particular self lubricated, or dry, bearings which require low friction in the absence of a separate lubricant fluid, particularly low levels of static, or break away, friction.

Plain bearings are known in which a backing strip of steel or comparable metal has formed thereon a lining layer comprising a porous metal matrix of sintered bronze and a low friction polymer based material and incorporating fillers, hereinafter referred to as a filled polymer infiltrated in to the interstices of the sintered matrix forming a relatively thin overlying skin, or polymer layer.

It is known to infiltrate the low friction polymer based material as an aqueous 'mush' which is pressed into the intestices of the bronze matrix to solidify it. It is also known to infiltrate the polymer based material as a 'dry paper'.

Such backed infiltrated sintered bronze bearings are used not only in dry bearing but also in oil lubricated bearings, there being similarities and differences as discussed below.

Polytetrafluoroethylene, hereafter referred to as 'PTFE', has good tribological properties and is often used as or in a lining material for plain bearings; however PTFE is soft and weak and has an unacceptably high wear rate when used alone and for practicability requires the addition of fillers which reinforce the lining material against rapid wear and low load bearing strength.

In a dry bearing, wear occurs as rubbing erosion which is directly responsible for removal of the filled PTFE, the rate of removal being determined by the roughness of the surface of the body borne by the bearing and thus the friction between the body and bearing, not only the of dynamic friction that exists between the relatively moving surfaces but also the greater static or break-away friction which has effect where there is continual starting and stopping or oscillation of the body.

In an oil lubricated bearing, wear occurs principally as a result of the lubricating oil bringing about cavitation erosion of the filled PTFE.

Although the wear mechanisms differs between dry and oil-lubricated bearings, and they require different fillers, they do share a common problem in respect of how to effect reinforcement and filling of the PTFE material.

Patent specification No. WO-A-95/02772 the contents of which are incorporated by reference, describes a plain bearing of the filled PTFE-infiltrated sintered bronze type that is specifically intended as an oil lubricated bearing. The specification summarises the perceived situation in the art regarding reinforcement and filler materials that provide strength and wear resistance, namely stating that the use of 'smooth' filamentary materials such as glass and aramid fibres per se that do not adhere to PTFE should be considered as unsuitable, before concentrating on the suitability of fibrillated aramid filaments (hereafter also referred to as aramid 'fibres') and in addition thereto particulate ionic fluoride fillers that results in a lining material having improved wear against cavitation erosion.

Whereas such cavitation erosion is not a consideration in dry bearings the strengthening effect of the fibrillated aramid fibres makes such lining material useful in dry bearings in respect of load bearing capability although of only modest performance in respect of wear by rubbing against anything but the smoothest of body surfaces borne thereby.

It is an object of the present invention to provide a plain bearing that has a lining layer of filled PTFE infiltrated sintered metal matrix and dry running strength and wear resistance better than hitherto, and method of manufacturing such bearing.

According to the present invention a plain bearing comprises a metal backing, a layer of a porous matrix of sintered metal on the backing and a filled PTFE infiltrated into, the interstices of the sintered layer and standing proud of the sintered layer, wherein the PTFE is filled with 1–20% by volume fibrillated aramid fibres and 10–30% by volume glass. Preferably the glass is present in the range 15 to 25% by volume, more preferably 20%. Also it is preferable the glass exists in the form of short filaments having lengths in the range 005 to 0.30 mm, most preferably 0.15 mm, and a diameter in the range 0.010 to 0.020 mm, more preferably 0.012 mm. Conveniently the glass is provided as milled filament E-glass, as readily available for use as reinforcement in polyester resins, and may accordingly be coated with silane sizing agent.

The PTFE may also be filled with particulate ferric oxide to an amount 0.5 to 2.5% by volume, preferably 1.2%, to act as a pigment and, if of suitable particle size, as an abrasive agent. The ferric oxide preferably has particle, sizes less than 0.005 mm. The PTFE may also be filled with carbon conveniently in an amorphous form such as carbon black, to an amount 0.5 to 10% by volume, to act as a pigment and as a lubricating agent. Carbon black may be present to about 10% to result in a polymer based lining having electrical conductivity. Where such conductivity in not required the carbon black is present preferably in the range 0.5 to 10% by volume, more preferably 1.6%. The presence of ferric oxide and/or carbon black is, however optional.

Preferably the total of the fillers, including the aramid fibres, approximates to 22% by volume.

It is found that when a dry bearing made in accordance with the invention is used to bear a body, typically iron or steel, that has surface asperities which give it an abrasive and effectively high friction surface, the abrasive properties of the glass and, if appropriate, the ferric oxide reduce surface asperities on the surface of the body and effect a polishing of the surface so that after a short period in operation the degree of abrasion of the lining, polymer is reduced and the overall life of the bearing is prolonged. This bearing structure, and its behaviour, is particularly impressive in respect of a body, such as a suspension component of an automobile which not only requires a significant load bearing capacity not usually expected from polymer infiltrated sintered bronze bearing but which also undergoes continuous oscillating motion, that is, one wherein twice per oscillation cycle the component surface is stationary with respect to the bearing and thus there is static friction to be overcome at the start of each motion. Thus, the abrasive action of the lining material on surface asperities of the component reduce both static and dynamic wear-inducing frictional resistance in a bearing which, by virtue of the reinforcement by the aramid fibres, has a good load bearing capacity.

In respect of the fibrillated aramid fibres and general method of manufacture the invention follows the aforementioned Patent specification No. WO-A-95/02772, namely the average length of the aramid fibres used in the invention may be 0.2–1.0 mm, their diameter prior to fibrillation may be 0.012 mm–0.015 mm and the degree of fibrillation (as measured as Canadian Freeness) may be 200 (Du Pont method TM 0894-84, Reference TAPPI-T-227M-58).

The invention also provides a method of manufacturing a plain bearing according to the inventions characterised in that the method comprises forming a mush of the constituents of the lining layer with an organic lubricant, spreading said mush over said sintered layer, and applying heat and pressure to force said mush into the interstice of said sintered layer, to solidify the mush, and to give it a smooth surface.

There now follows examples which illustrates the invention.

In the example, one litre of an aqueous dispersion of PTFE (Fluon GP 2 from ICI) was mixed with 50 ml of ferric oxide (Microtint Red Oxide 1008 from Chromachem) and 25 ml carbon black. Next, an aqueous slurry of fibrillated aramid fibres (sold as Kevlar Grade If 368 by Du Pont) was made by processing in a hydropulper to produce an aqueous slurry followed by disc refining to give the require degree of fibrillation and 800 nm thereof was added to the mixture to give 2% by solid volume of the fibres, the Are being starred to effect mixing for 10 minutes 400 ml of an organic lubricant (Toluene) was added and mixed by stirring together for 10 minutes. To this mixture 280 grammes (equivalent to 15% by volume of the solid content of the PTEE dispersion or 20.5% by volume of the eventual material) of milled glass having filaments of length nominally 0.15 mm and diameter 0.012 mm (E-glass having a silane sizing coat) was added and the mixture was stirred for 5 minutes. Then 50 ml of a 10% aqueous solution of aluminium nitrate was added to coagulate the suspension, the slurry so obtained being stirred for 10 minutes and then allowed to settle out. The supernatant liquid was then decanted and discarded leaving a wet mush The mush was fed by hand over a sintered bronze matrix secured to a steel backing. Heat and pressure was then applied to the mush by rollers to infiltrate it into the interstices of the bronze matrix, to solidify it, and to give it a smooth surface. This gave a bearing material with a surface 0.025 mm above that of the bronze matrix. The bearing, thus produced, had a lining layer having a PTFE lining polymer containing 2.3% by volume fibrillated Rid fibres, 20.5% by volume of milled glass, 1.2% by volume of ferric oxide and 1.6% by volume of carbon black, the reminder being PTFE of 74.4% by volume The bearing material was formed into cylindrical bearing bushes which, under test with an oscillating steel shaft, were found to have good friction characteristics, load bearing capacity and superior oscillating rubbing erosion resistance.

The ferric oxide and/or carbon black may be omitted preferably by increasing the glass content and reducing the PTFE and fibrillated aramid content, for example, adjusting the above proportions so that the filled PTFE lining polymer contains 1.5% by volume fibrillated aramid fibres, 25% glass and 73.5% by volume PTFE.

In respect of having an electrically conductive lining due to a carbon content of 10% by volume, the percentages may be revised, for example to have 2.3% by volume fibrillated aramid fibres, glass 20% by volume, ferric oxide 1.2% by volume, and PTFE 66.5% by volume.

Although the above description and example of manufacture has concentrated upon preparation of the filled PTFE polymer as a wet 'mush', it will be appreciated from the above referenced patent specification that it is possible to produce a filled PTFE polymer as dry paper for infiltrating into the sintered metal matrix, and that by replacing some or all of the known filled materials with the above described glass, and optionally ferric oxide and amorphous carbon, such 'dry-paper' method may be employed in manufacturing a bearing in accordance with the invention

What is claimed is:

1. A plain bearing for dry operation, the bearing comprising a metal backing, a layer of a porous matrix of sintered metal on the backing and a filled PTFE infiltrated into the interstices of the sintered layer and standing proud of the sintered layer, and characterised in that the PTFE contains filler material selected from the group consisting of: (1) 1 to 20% by volume fibrillated aramid fibers and 10 to 30% by volume glass, (2) 1 to 20% by volume fibrillated aramid fibers, 10 to 30% by volume of glass, and ferric oxide, (3) 1 to 20% by volume fibrillated aramid fibers, 10 to 30% by volume of glass, and carbon, and (4) 1 to 20% by volume fibrillated aramid fibers, 10 59 30% by volume of glass, ferric oxide, and carbon; wherein the glass is present as filaments having a length substantially equal to 0.15 mm and diameter in the range 0.010 to 0.20 mm.

2. A plain bearing as claimed in claim 1 characterised in that the PTFE is filled with carbon black in the range 0.5 to 10% by volume.

3. A plain bearing as claimed in claim 2 characterised in that the carbon black is present as 1.6% by volume.

4. A plain bearing as claimed in claim 1 characterised in that the glass is present as filaments having a diameter substantially equal to 0.012 mm.

5. A plain bearing as claimed in claim 1 characterised in that the content of fillers in the PTFE approximates to a total of 22% by volume.

6. A plain bearing as claimed in claim 1 characterised in that the glass is coated with a silane sizing agent.

7. A plain bearing as claimed in claim 1 characterised in that the glass is present as 20% volume.

8. A plain bearing as claimed in claim 1 characterised in that the PTFE is filled also with particulate ferric oxide in the range 0.5 to 2.5% by volume.

9. A plain bearing as claimed in claim 8 characterised in that the ferric oxide has a particle size less than 0.005 mm.

10. A plain bearing as claimed in claim 8 characterised in that the particulate ferric oxide is present as 1.2% by volume.

11. A plain bearing for dry operation, the bearing comprising a metal backing, a layer of a porous matrix of sintered metal on the backing and a filled PTFE infiltrated into the interstices of the sintered layer and standing proud of the sintered layer, and characterised in that the PTFE is filled with 1 to 20% by volume fibrillated aramid fibers and 10 to 30% by volume of glass, wherein the glass is E-glass.

12. A plain bearing as claimed in claim 11 characterised in that the carbon is carbon black ranging from 0.5 to 10% by volume.

13. A plain bearing as claimed in claim 12 characterised in that the carbon black is present as 1.6% by volume.

14. A plain bearing as claimed in claim 11 characterised in that the glass is present as 15 to 25% by volume.

15. A plain bearing as claimed in claim 14 characterised in that the glass is present as 20% by volume.

16. A plain bearing as claimed in claim 11 characterised in that the glass is present as filaments having a length in the range 0.05 to 0.30 mm and diameter in the range 0.010 to 0.020 mm.

17. A plain bearing as claimed in claim 16 characterised in that the glass filaments have a length substantially equal to 0.15 mm.

18. A plain bearing as claimed in claim 16 characterised in that the glass is present as filaments having a diameter substantially equal to 0.012 mm.

19. A plain bearing as claimed in claim 16 characterised in that the glass is coated with a silane sizing agent.

20. A plain bearing as claimed in claim 11 characterised in that the content of fillers in the PTFE approximates to a total of 22% by volume.

21. A plain bearing as claimed in claim 11 characterised in that the ferric oxide is particulate ferric oxide ranging from 0.5 to 2.5% by volume.

22. A plain bearing as claimed in claim 21 characterised in that the ferric oxide has a particle size less than 0.005 mm.

23. A plain bearing as claimed in claim 21 characterised in that the particulate ferric oxide is present as 1.2% by volume.

* * * * *